PETER NAYLOR.
Improvement in Casting Water-Traps.
No. 127,787. Patented June 11, 1872.
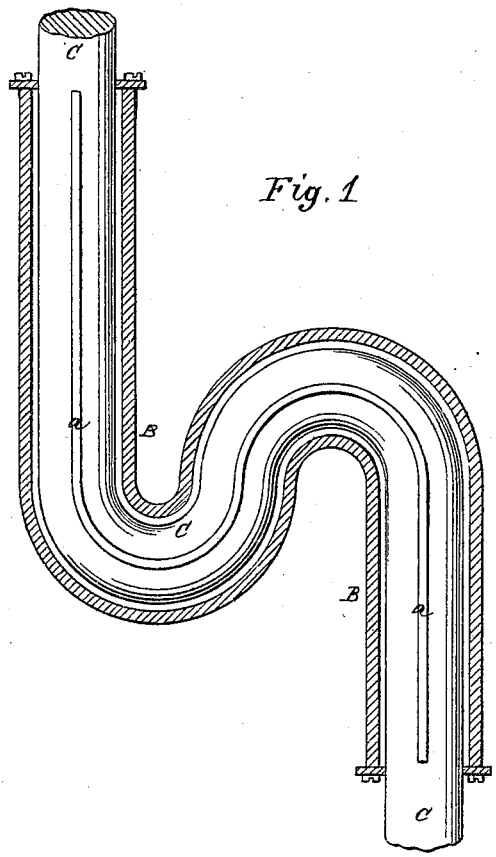
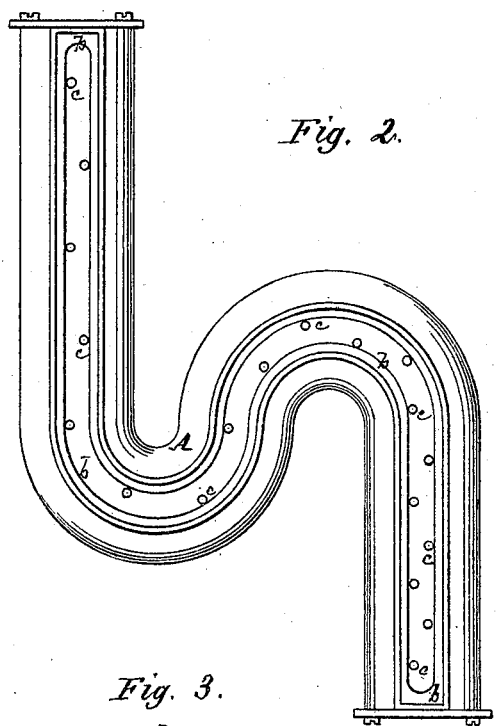
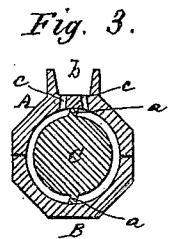
Witnesses
C. B. Nottingham
J. R. Nottingham
Inventor.
Peter Naylor
by atty A. Pollok

UNITED STATES PATENT OFFICE.

PETER NAYLOR, OF NEW YORK, N. Y.

IMPROVEMENT IN CASTING WATER-TRAPS.

Specification forming part of Letters Patent No. 127,787, dated June 11, 1872.

*To whom it may concern:*

Be it known that I, PETER NAYLOR, of the city, county, and State of New York, have invented certain new and useful Improvements in Casting Water-Traps, of which the following is a specification:

The manufacture of water or plumbers' trap has heretofore been conducted in one of three ways: either by dressing up two pieces of sheet lead on suitably-shaped forms and then soldering the pieces together; or by casting the trap in one piece; or by casting it in halves in separate and distinct molds, and then soldering the pieces together. The first method was expensive, consumed much time, and did not produce reliable work. The second method involved much trouble, and, owing to the difficulty of extracting the core, was almost impracticable. The third method while more practical than the others still was defective and imperfect, requiring the use of two separate molds, and not insuring at all times the uniformity and accuracy necessary to allow the two sections of the trap to be readily and easily fitted together.

My invention relates to the production of a trap of the last-named construction; and it consists in casting the two sections or halves in one mold, and at one operation, and under a head or pressure of metal which is caused to enter both sides of the mold through a number of openings in a "runner" or head on the upper section of the mold, thus insuring a perfectly solid casting.

In the accompanying drawing I have represented the manner in which my invention is or may be carried into effect.

Figure 1 represents the mold and core, with the top half of the mold removed. Fig. 2 is a plan of the top half of the mold. Fig. 3 is a cross-section of the mold, showing the dividing flanges which separate the two sections of the trap in the mold.

In carrying out my invention I make use of a mold, composed of two half sections, A B, the upper one, A, shown in Fig. 2, and the lower one, B, in Fig. 1. I also make use of a core, C, which is to be adjusted accurately in the mold, so as to allow the lead to flow around it uniformly in thickness throughout, and is held in the lower half of the mold by suitable guides or pins. The lines of division of the mold are on the top and bottom of the trap. The core is provided with longitudinal fins or dividing-plates, $a$, arranged diametrically opposite each other, and intended to divide the casting into two parts, being so placed as to bring the lines of division on the sides of the trap. On the exterior of the upper section of the mold is formed a "runner" or head, $b$, arranged over the line where the upper dividing plate $a$ of the core is located, and provided with a number of openings, $c$, opening into the interior of the mold, some on one side of the upper plate or fin $a$, and others on the other side of the same, so that the metal may flow equally to both sides of the mold.

The mode of operation is as follows: The two halves of the mold are fitted together with the core adjusted accurately between them, as above stated. The lead is then poured into the "runner" or head on the top of the mold, and flows through the perforations or openings into the mold, casting both halves of the trap at one operation. The surplus lead is removed from the "runner" with a chisel or other suitable tool, the little surplus remaining on the upper half being pared off with a knife. The upper half of the mold is then removed, and the core lifted out with the two half sections of the trap attached. In case any portions of the lead have run together, joining the two half sections, they may be separated with a knife. The two halves are then joined together with tinners'. or plumbers' solder, or are burned together to complete the trap.

For the purpose of handling the molds with greater facility, iron or brass stems with wooden handles are attached to them at convenient points. I am thus enabled to cast the two sections of the trap at one operation, and in such manner as to insure perfect accuracy, and to admit of their being subsequently united with great ease; and by the employment of the "runner" or head I cast them under a head or pressure of metal, thus insuring solidity and a perfect casting. The lines of division of the mold are in a plane at an angle with the plane of the lines of division of the trap, the latter lines being determined by the location of the dividing plates $a$ of the core, this arrangement being of advantage in facilitating the casting and admitting of the more easy application of the "runner" or head C.

Having described my invention and the manner in which the same is or may be carried into effect, what I claim and desire to secure by Letters Patent, is—

1. Casting the two sections of a trap at one operation and in one mold, substantially in the manner and by the means herein shown and described.

2. In a mold for casting traps, substantially as described, the formation of a "runner" or head on the upper section of the mold, with perforations opening into the mold, a part on one side and a part on the other side of the upper dividing plate or fin of the core, substantially as herein shown and set forth.

In testimony whereof I have signed my name to this specification before two subscribing witnesses.

PETER NAYLOR.

Witnesses:
  W. A. SHAW,
  THOMAS E. BOTHWELL.